United States Patent [19]

Hayes

[11] Patent Number: 5,981,635
[45] Date of Patent: Nov. 9, 1999

[54] POLYACETAL COMPOSITIONS CONTAINING AT LEAST ONE ACETYLATED HINDERED AMINE LIGHT STABILIZER

[75] Inventor: Richard Allen Hayes, Houston, Tex.

[73] Assignee: E. I. du Pont de Nemours and Company, Wilmington, Del.

[21] Appl. No.: 07/976,846

[22] Filed: Nov. 16, 1992

Related U.S. Application Data

[63] Continuation-in-part of application No. 07/722,456, Jun. 27, 1991, abandoned.

[51] Int. Cl.$^6$ .................................................. C08K 5/34
[52] U.S. Cl. .......................... 524/99; 524/91; 524/102; 524/205; 524/287
[58] Field of Search ................. 524/91, 99, 102, 524/205, 287

[56] References Cited

U.S. PATENT DOCUMENTS

| | | | |
|---|---|---|---|
| 4,241,208 | 12/1980 | Murayama et al. | 546/20 |
| 4,439,565 | 3/1984 | Winter et al. | 524/103 |
| 4,730,015 | 3/1988 | Ikenaga et al. | 524/91 |
| 4,766,168 | 8/1988 | West | 524/377 |
| 4,814,397 | 3/1989 | Novak | 525/154 |
| 5,011,890 | 4/1991 | Novak | 525/154 |

FOREIGN PATENT DOCUMENTS 2074564  11/1981  United Kingdom .

OTHER PUBLICATIONS

Tinuvin® 440 UV Light Stabilizer for Acid Catalyzed Coatings—Ciba–Geigy (7 Pages) Document A5215M97.

*Primary Examiner*—Kriellion Sanders

[57] ABSTRACT

Incorporation into polyacetal compositions of at least one hindered amine light stabilizer which contains a hindered nitrogen that is acetylated results in a composition having good light stability, thermal stability, and physical property retention after exposure to heat and air.

3 Claims, No Drawings

POLYACETAL COMPOSITIONS CONTAINING AT LEAST ONE ACETYLATED HINDERED AMINE LIGHT STABILIZER

This application is a continuation-in-part of U.S. patent application Ser. No. 07/722,456, filed Jun. 27, 1991, abandoned.

BACKGROUND OF THE INVENTION

TECHNICAL FIELD

This invention relates to certain polyacetal compositions containing at least one acetylated hindered amine light stabilizer, said compositions being characterized as having good stability upon exposure to light. Hereinafter, the term "hindered amine light stabilizer" shall be referred to as "HALS."

Polyacetal, also commonly referred to as polyoxymethylene, compositions are generally understood to include compositions based on homopolymers of formaldehyde, the terminal groups of which are end-capped by esterification of formaldehyde and other monomers that yield oxyalkylene groups with at least two adjacent carbon atoms in the main chain, the terminal groups of which copolymers can be hydroxyl terminate or can be end-capped by esterification or etherification. Compositions based on polyacetals of relatively high molecular weight, i.e., 10,000 to 100,000 are useful in preparing semi-finished and finished articles by any of the techniques commonly used with thermoplastic materials, e.g. compression molding, injection molding, extrusion, blow molding, rotational molding, melt spinning, stamping, thermoforming and the like. Finished articles made from such compositions possess desirable physical properties, including high stiffness, strength, low coefficient of friction, and good solvent resistance.

In some applications, polyacetal compositions are exposed to light for long periods of time. It is desired that said polyacetal compositions remain relatively stable upon exposure to light for such periods of time. To impart or improve the light stability of a polyacetal composition, a HALS may be added thereto. However, it is not uncommon that the addition of such a HALS can adversely affect other properties of the polyacetal composition, such as the melt processing thermal stability (e.g. gaseous formation evolution or discoloration during melt processing) of the composition and/or the ability of the composition to retain physical properties upon exposure to the heat and air. The present invention serves to alleviate such a problem.

SUMMARY OF THE INVENTION

The present invention relates to polyacetal compositions consisting essentially of (a) 95.00 to 99.95 weight percent of a polyacetal and (b) 0.05 to 5.00 weight percent of at least one acetylated HALS, said acetylated HALS preferably being selected from the group consisting of HALS (I) and HALS (II) as follows:

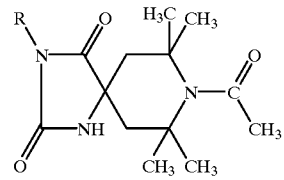
(I)

where R represents $C_1$–$C_{40}$ alkyl, preferably $C_{12}$;

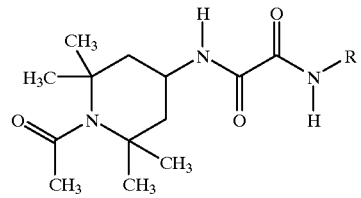
(II)

where R represents $C_1$–$C_{40}$ alkyl, preferably $C_{12}$.

The polyacetal compositions of the present invention possess good light stability and do not suffer a significant loss of certain physical properties inherent in a polyacetal (such as melt processing stability and/or ability to retain physical properties upon exposure to heat and light).

Additionally, and for increased light stability, the compositions of the present invention can contain UV absorbers and/or other HALS having a hindered nitrogen that is of secondary functionality or alkyl-substituted tertiary functionality.

The compositions of the present invention are useful wherever it is desired to use a polyacetal composition needing enhanced light stability.

DETAILED DESCRIPTION OF THE INVENTION

I. The Compositions of the Present Invention

The composition of the present invention consists essentially of (a) 95.00 to 99.95 weight percent of a polyacetal and (b) 0.05 to 5.00 weight percent of at least one acetylated HALS preferably selected from HALS (I) and HALS (II), given above. More preferably, the composition of the present invention consists essentially of 97.00 to 99.95 weight percent of the component (a) and 0.05 to 3.00 weight percent of the component (b). Most preferably, the composition of the present invention consists essentially of 98.50 to 99.95 weight percent of the component (a) and 0.05 to 1.50 weight percent of the component (b). All the above weight percents are based on the total amount of components (a) and (b) only.

IA. Component (a)—Polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the thermal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally sued in preparing polyacetal compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

IB. Component (b). Acetylated HALS (I) and HALS (II).

The acetylated HALS used herein contains a hindered nitrogen that is acetylated. The preferred acetylated HALS is selected from HALS (I) and HALS (II), having structures as follows:

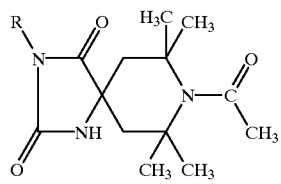

(I)

where R represents $C_1$–$C_{40}$ alkyl, preferably $C_{12}$;

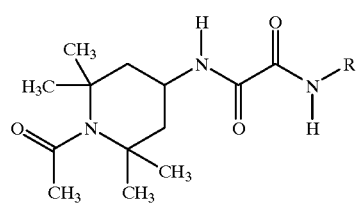

(II)

where R represents $C_1$–$C_{40}$ alkyl, preferably $C_{12}$. Acetylated HALS (I) is most preferred. HALS (I) and HALS (II) can be prepared by techniques readily available to those skilled in the art. HALS (I), wherein R=$C_{12}$, is available commercially under the trade name of Tinuvin® 440 (Ciba-Geigy) and is described in U.S. Pat. No. 4,241,208. HALS (II), wherein R=$C_{12}$, is available commercially under the trade name of Sanduvor® -3054 (Sandoz Company).

II. Optional Components

The compositions of the present invention may optionally contain UV absorbers, HALS wherein the hindered nitrogen of the HALS is of secondary functionality or alkyl-substituted teritary functionality, and/or other ingredients known to be useful in polyacetal compositions.

IIA. UV Absorbers

If a UV absorber is incorporated into the compositions of the present invention, described above, then it is recommended that said compositions consist essentially of (a) 95.00 to 99.90 weight percent of the polyacetal, (b) 0.05 to 2.50 weight percent of the acetylated HALS component described above, and (c) 0.05 to 2.50 weight percent of at least one UV absorber, wherein said UV absorber is preferably selected from the group consisting of 2-hydroxybenzophenones, 2-(2'-hydroxyphenyl) benzotriazoles, benzoates, substituted oxanilides, and cyano acrylates. Most preferably, the UV absorber is selected from 2-(2'-hydroxyphenyl)benzotriazole. For best light stability, it is recommended that the compositions of the present invention contain at least one UV absorber, as described above.

Specific typical examples of 2-hydroxybenzophenones include 2-hydroxy-4-methoxybenzophenone, 2-hydroxy-4-octoxybenzophenone, 5,5'-methylenebis(2-hydroxy-4-methoxybenzophenone), 2,4-dihydroxybenzophenone, and 2,2'-dihydroxy-4-methoxybenzophenone. Specific typical examples of 2-(2'-hydroxy-5'-methylphenyl)benzotriazoles include 2-(2'-hydroxy-5'-methylphenyl)benzotriazole, 2-(2'-hydroxy-3',5'-di-tert-butylphenyl)benzotriazole, 2-(2'-hydroxy-3',4'-di-tertbutylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl) benzotriazole, 2-(2'-hydroxy-3',5'-dicumylphenyl) benzotriazole and 2,2'-methylenebis(4-tert-octyl -6-benzotriazolyl)phenol.

Specific typical examples of benzoates include phenyl salicylate, resorcinol monobenzoate, 2,4-di-tert-butyl-phenyl-3',5'-di-tert-butyl-4'-hydroxybenzoate, and hexadecyl-3,5-di-tert-butyl-4-hydroxybenzoate.

Specific typical examples of substituted oxanilides include 2-ethyl -2'-ethoxyoxanilide and 2-ethoxy-4'-dodecyloxanilide.

Specific typical examples of cyanoacrylates include ethyl alpha-cyano-, alpha-diphenylacrylate and methyl 2-cyano-3-methyl-3-(p-methoxyphenyl)acrylate.

UV absorbers are commercially available or can be prepared by techniques readily available to those skilled in the art. The use of at least one UV absorber in combination with at least one acetylated HALS in a polyacetal composition is particularly beneficial to the light stability of the composition due, in part, to the synergistic interaction between the acetylated HALS and the UV absorber.

IIB. "Non-acetylated" HALS

Other types of HALS that optionally may be included in the compositions of the present invention are those wherein the hindered nitrogen in the HALS is not acetylated (hereinafter referred to as "non-acetylated HALS"). Preferably, these non-acetylated HALS are those having a hindered nitrogen that is of secondary functionality or is of alkyl-substituted tertiary functionality. Most preferably, these non-acetylated HALS are those that contain a tetra alkyl piperidene residue and/or a terta-alkyl-oxo-piperazinyl residue where hindered the nitrogen in the piperidine or piperazinone ring is alkylated with a $C_1$–$C_6$ group, preferably a methyl group.

Specific examples of these non-acetylated HALS include bis( 1,2,2,6,6-pentamethyl-4-piperidinyl)[3,5-bis( 1,1-dimethylethyl-4-hydroxyphenyl)methyl] butylpropanedioate, dimethyl succinate/4-hydroxy -2,2,6,6-tetramethyl-1-piperidineethanol polycondensate, bis(2,2,6, 6-tetramethyl-4-piperidinyl/decanedioate, bis(l-octyloxy-2, 2,6,6-tetramethyl-4-piperidinyl)sebacate, poly[[6-[ 1,1,3, 30tetramethyl-butyl)amino]-s-triazine-2,4-diyl][2,2,6,6- tetramethyl-4-piperidyl)imino]hexamethylene[(2,2,6,6-tetramethyl-4-piperidyl)imino]], 1,1'-(1,2-ethanediyl)bis[3,3,5,5-tetramethyl piperazinone], poly((6-((4-piperidone)imino)-s-triazine-2,4-diyl)(2-(2,2,6,6-tetramethylpiperidinyl)imino-hexamethylene-(4-(2,2,6,6-tetramethylpiperidinyl)imino)), 1-[2-(3,5-di-tert-butyl-4-hydroxyphenyl)propionyloxy)ethyl]-4-(3,5-di-tert-butyl-4-hydroxyphenyl)proprionyloxy)-2,2,6,6-tetramethylpiperidine, the HALS having the structure (III), as in the Examples below, and the HALS having the structure (IV), as follows:

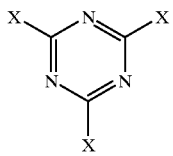

(IV)

wherein X is

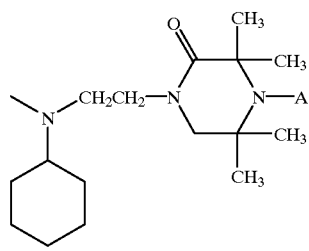

and A is selected from H and $C_1$–$C_6$ alkyl.

Non-acetylated HALS are commercially available or can be prepared by techniques readily available to those in skilled in the prior art.

IIC. Other Ingredients

It should be understood that the compositions of the present invention can also include, in addition to the polyacetal, the acetylated HALS, the optional UV absorbers, and the optional non-acetylated HALS, other ingredients, modifiers, and additives as are generally used in polyacetal molding resins, such as thermal stabilizers, antioxidants, colorants (including pigments), toughening agents, reinforcing agents, UV stabilizers, nucleating agents, lubricants, fillers (include glass fiber), and the like.

Thermal stabilizers of particular interest include polyamide stabilizers, especially nylon terpolymers, hydroxy-containing polymers such as those described in U.S. Pat. Nos. 4,766,168 and 4,814,397, non-meltable nitrogen-containing or hydroxy-containing polymers, such as described in U.S. Pat. No. 5,011,890, and non-meltable naturally occurring polymers, such as microcrystalline cellulose.

III. Preparation of the Compositions

The compositions of the present invention can be prepared by mixing all components and ingredients with the polyacetal at a temperature above the melting point of the polyacetal using any intensive mixing device conventionally used in preparing thermoplastic polyacetal compositions, such as rubber mills, internal mixers such as "Banbury" and Brabender" mixers, single or multiblade internal mixers with a cavity heated externally or by friction, "ko-kneaders", multibarrel mixers such as "Farrel Continuous Mixers", injection molding machines, and extruders, both single screw and twin screw, both co-rotating and counter rotating.

These devices can be used alone or in combination with static mixer, mixing torpedoes and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 180° C. to 240° C, and most preferably 195° C. to 225° C.

Shaped articles can be made from the compositions of the present invention using any of several common methods, including compression molding, injection molding, extrusion, melt spinning, rotational molding, melt spinning, and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170° C. to 270° C., preferably 185–240° C., most preferably 200–230° C. When injection molding the compositions of the present invention, it is preferred that the mold be as cold as possible consistent with the intricacy of the shape being produced. Generally, the mold temperature will be 10–120° C., preferably 10–100° C., and most preferably about 50–90° C.

EXAMPLES

The following examples are the results of tests conducted with polyacetal compositions to determine the effectiveness of the present invention. Also provided are test results on control polyacetal compositions. All temperatures are in degrees Celsius unless otherwise specified. Measurements have been rounded where appropriate.

Unless otherwise stated, the polyacetal used in the examples below was as an acetate end-capped homopolymer having a number average molecular weight of about 40,000.

The acetylated HALS used in the examples below were as follows:

"Acetylated HALS (IA)" was 8-acetyl-3-dodecyl-7,7,9,9-tetramethyl-1,3,8-triazaspiro(4,5)decane-2,4-dione having HALS (IA) structure as follows:

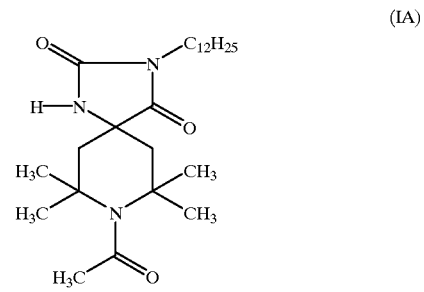

(IA)

"Acetylated HALS (IIA)" had HALS (IIA) structure as follows:

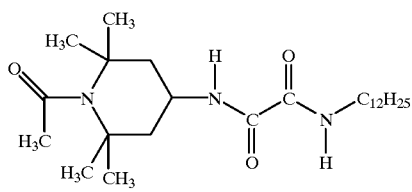

(IIA)

The UV absorber used in the examples below was as follows:

"UV absorber A" was 2-(2H-benzotriazol-2-yl)-4,6-bis(1-methyl-1-phenylethyl)phenol.

Non-acetylated HALS used in the examples below were as follows:

"Non-acetylated HALS A" was poly-((6-((4-piperidone)-imino)-s-triazine-2,4-diyl)(2-(2,2,6,6-tetramethylpiperidinyl)-imino-hexamethylene-(4-(2,2,6,6-tetramethylpiperidinyl)-imino)), having the structure (III):

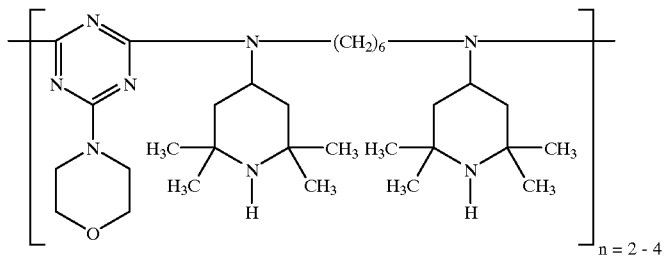

(III)

"Non-acetylated HALS B" was bis(1,2,2,6,6-pentamethyl-4-piperidinyl)[3,5-bis( 1, 1-dimethylethyl-4-hydroxyphenyl)methyl] butylpropanedioate.

The samples tested below were prepared in the manner as follows: all components were mixed together and melt compounded on a 2.5-inch Sterling single screw extruder with barrel temperature settings of 150° C. to 200° C., die temperature settings of 210° C., and screw speeds of 75 rpms. The temperature of the melt as its exited the die ranged from 220° C. to 230° C.

The UV stability of the sample compositions was determined through exposure to UV light, as described below. The compositions were tested to determine weight loss after UV exposure. Samples for the "weight loss after UV exposure" test were molded plaques having dimensions of 5 cm×8.1 cm×4 mm. The molded plaques weighed between 21 to 23 grams and the surface finish of said plaques was a high gloss surface. The high gloss side of the plaque was exposed to a UV light source at a prescribed amount (i.e., as specified in the Tables, below). The sample compositions were subjected to UV exposure under the same conditions. Sample compositions were weighted prior to testing and subjected to accelerated UV exposure in an Atlas Ci65 Xenon Arc Weatherometer, operated as per SAE J1885 (Automotive Interior Conditions), with a quartz inner filter and a borosilicate outer filter. Pertinent details of the SAE J1885 method appear directly below as follows:

|  | Light Cycle | Dark Cycle |
|---|---|---|
| Irradiance (Watts/m$^2$) | 0.55 | — |
| Black Panel Temp. (°C.) | 89.0 | 38.0 |
| Relative Humidity (%) | 50.0 | 100.0 |
| Cycle Time (Hours) | 3.8 | 1.0 |

Weight loss after UV exposure was determined by weighing the sample after exposure to UV light (at the prescribed amount) and then calculating percent weight loss. Weight loss is a standard test for studying polyacetal UV degradation.

Color Difference (DE) after UV exposure was measured by the Color Difference Calculations Method. The Color Difference Calculations Method is an instrumental means of color grading. It is noted that it is not as sensitive as the human eye and therefore, the final judgement criteria is usually visual assessment. The instrument used was a Macbeth 1500/Plus Color Measurement System, which gives color difference calculation measurements as per SAE J1545, which employs CIELAB color space, a D65 illuminant, and a 10 degree observer with specular reflectance includes. Color differences were measured and compared for an unexposed sample plaque and the exposed sample plaque. All exposed color sample plaques were wiped with a tissue prior to this comparison to remove any surface films that might disrupt the reading of the true color difference measurements.

The thermal stability of the sample compositions was determined using a thermally evolved formaldehyde ("TEF") test procedure. A weighed sample of the polyacetal compositions to be tested was placed in a tube and the tube was fitted with a cap for introduction of nitrogen to the test sample for removal of any evolved gasses from the apparatus while maintaining the sample in an oxygen free environment. The tube that contained the sample was heated at 259° C. in a silicone oil bath. The nitrogen and any evolved gases transported thereby were bubbled through 75 ml of a 40 g/liter sodium sulfite in water solution. Any evolved formaldehyde reacts with the docium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N) \frac{0.03 \times 100}{SW}$$

where

V=the volume of titer in milliliters,

N=the normality of the titer, and

SW=the sample weight in grams.

The factor "0.03" is the milliequivalent weight of formaldehyde in g/milliequivalent. TEF results are reported in the Tables, below, under "Wt. % $CH_2O$ Loss@ 259° C.," with the reported results at 15 and 30 minutes. The long term thermal-oxidative stability (i.e., physical property retention ability) of the sample compositions was determined using an air oven aging method. Compounded compositions were injection molded into 1/8-inch thick tensile bars using a barrel temperature setting of approximately 207° C. and a mold temperature setting of approximately 88° C. The tensile bars of each composition were pre-weighed and were placed in a circulating air oven at 130° C. for the times noted in the Tables, below. Oven location effects were averaged by distributing bars of a sample throughout the oven. The data reported for each sample represents an average of at least three tensile bars. At the end of the specified time period, the samples were removed from the oven, weighed, and tested for tensile strength (TS) and elongation (E) according to ASTM Method 0-638 (0.2 in/min. crosshead speed). Percent weight loss (% WL) was also calculated.

Examples 1–3

The components for the compositions of Examples 1–3 and $C_1$–$C_3$ are given below in Table IA. Each composition in Table IA additionally contained the following: 0.75 weight percent of an ethylene vinyl alcohol copolymer (prepared as disclosed in U.S. Pat. No. 4,766,168 and hereinafter referred to as "EVOH"), 0.25 weight percent of a 33/23/43 nylon terpolymer of nylon 66, nylon 6/10, and nylon 6, respectively (hereinafter referred to as "nylon"), 0.10 weight percent of triethyleneglycol bis(3,3'-tert-butyl-4'-hydroxy-5'-methylphenyl)proprionate (hereinafter referred to as "Antioxidant A"), 0.05 weight percent of N,N'-hexamethylene bis (3,5-di-tert-butyl-4-hyroxyhydrocinnamide) (hereinafter referred to as "Antioxidant B"), and 0.50 weight percent of polyethylene glycol having an average molecular weight of 8,000 (hereinafter referred to as "PEG"). All weight percents provided in this paragraph and in Table IA are based upon total composition weight.

The results of tests for each composition in Table IA are given in Table IB and Table IC, below. The composition of Example 1, which contained acetylated HALS IA, had better UV light stability, thermal stability, and air oven aging stability (i.e., physical property retention) than did the composition of Example C2, which contained a HALS that was not acetylated. The composition of Example 3, which contained acetylated HALS IA and UV absorber (A) had better light stability than the composition of Example 2, which contained acetylated HALS IA, and the composition of Example C3, which contained UV absorber (A).

TABLE IA

| Example | Polyacetal (wt. %) | Acetylated HALS (wt. %) | UV Absorber (wt. %) | Non-Acetylated HALS (wt. %) |
|---|---|---|---|---|
| C1 | 98.35 | — | — | — |
| C2 | 98.05 | — | — | 0.30 A |
| 1 | 98.05 | 0.30 IA | — | — |
| C3 | 97.75 | — | 0.60 A | — |

TABLE IA-continued

| Example | Polyacetal (wt. %) | Acetylated HALS (wt. %) | UV Absorber (wt. %) | Non-Acetylated HALS (wt. %) |
|---|---|---|---|---|
| 2 | 97.75 | 0.60 IA | — | — |
| 3 | 97.15 | 0.60 IA | 0.60 A | — |

TABLE IB

| | UV Exposure Level | | | |
|---|---|---|---|---|
| | 900 kJ/m$^2$ | | 2000 kJ/m$^2$ | |
| Example | % WL | DE | % WL | DE |
| C1 | 9.85 | 5.14 | 23.6 | 8.22 |
| C2 | 0.89 | 20.2 | 1.98 | 20.7 |
| 1 | 1.03 | 5.91 | 4.73 | 6.85 |
| C3 | 0.09 | 1.20 | 1.33 | 1.85 |
| 2 | 0.31 | 1.94 | 1.12 | 7.57 |
| 3 | −0.10 | 0.32 | 0.05 | 1.51 |

TABLE IC

| | Wt. % $CH_2O$ Loss @ 259° C. | | Air Oven Aging | |
|---|---|---|---|---|
| | | | Initial TS/E | 40 Days/130° C. TS/E/WL |
| Example | 15 min. | 30 min. | (psi/%) | (psi/%/%) |
| C1 | 0.06 | 0.51 | 9570/40 | 10580/20/0.38 |
| C2 | 0.34 | 1.15 | 9680/39 | 4070/1.3/4.28 |
| 1 | 0.08 | 0.39 | 9720/34 | 10210/15/0.64 |

Examples 4–8

The components for the compositions of Examples 4–8 and C1–C4 are given below in Table IIA. Each composition in Table IIA additionally contained the following: 0.75 weight percent EVOH, 0.25 weight percent nylon, 0.10 weight percent antioxidant A, 0.05 weight percent Antioxidant B, and 0.50 weight percent PEG. All weight percents in this paragraph and in Table IIA are based upon total composition weight.

The results of tests for each composition in Table IIA are given in Table IIB and Table IIC, below. Sample compositions 4 and 5, each of which contained Acetylated HALS IIA, had better light stability, thermal stability, and air oven aging stability, than did sample compositions C4 and C2 (each of which contained non-acetylated HALS A), respectively.

TABLE IIA

| Example | Polyacetal (wt. %) | Acetylated HALS (wt. %) | UV Absorber (wt. %) | Non-Acetylated HALS (wt. %) |
|---|---|---|---|---|
| C1 | 98.35 | — | — | — |
| C4 | 98.25 | — | — | 0.10 A |
| 4 | 98.25 | 0.10 IIA | — | — |
| C2 | 98.05 | — | — | 0.30 A |
| 5 | 98.05 | 0.30 IIA | — | — |
| 6 | 97.75 | 0.60 IIA | — | — |
| C3 | 97.75 | — | 0.60 A | — |

TABLE IIA-continued

| Example | Polyacetal (wt. %) | Acetylated HALS (wt. %) | UV Absorber (wt. %) | Non-Acetylated HALS (wt. %) |
|---|---|---|---|---|
| 7 | 97.15 | 0.60 IIA | 0.60 A | — |
| 8 | 97.75 | 0.30 IIA | 0.30 A | — |

TABLE IIB

| | UV Exposure Level | | | |
|---|---|---|---|---|
| | 900 kJ/m$^2$ | | 2000 kJ/m$^2$ | |
| Example | % WL | DE | % WL | DE |
| C1 | 9.85 | 5.14 | 10.4 | 4.55 |
| C4 | 2.81 | 13.6 | 5.47 | 13.5 |
| 4 | 1.91 | 7.94 | 4.39 | 8.19 |
| C2 | 0.89 | 20.2 | 1.11 | 20.4 |
| 5 | 2.49 | 9.70 | 4.39 | 9.54 |
| 6 | 1.90 | 9.19 | 3.44 | 9.41 |
| C3 | 0.90 | 1.20 | 0.40 | 1.16 |
| 7 | −0.13 | 1.69 | 0.04 | 1.83 |
| 8 | −0.14 | 1.14 | 0.06 | 1.14 |

TABLE IIC

| | | | | Air Oven Aging |
|---|---|---|---|---|
| | Wt. % CH$_2$O Loss @ 259° C. | | Initial TS/E | 40 Days/130° C. TS/E/WL |
| Example | 15 min. | 30 min. | (psi/%) | (psi/%/%) |
| C1 | 0.06 | 0.51 | 9570/40 | 10580/20/0.38 |
| C4 | 0.17 | 0.76 | 9910/38 | 5680/2.3/2.71 |
| 4 | 0.07 | 0.46 | 9660/37 | */*/0.75 |
| C2 | 0.34 | 1.15 | 9680/39 | 4070/1.3/4.28 |
| 5 | 0.13 | 0.68 | 9480/49 | */*/0.91 |
| 6 | 0.09 | 0.67 | 9420/47 | */*/1.65 |

*not available

Examples 7–11

The components for the compositions of Examples 7–11 are given below in Table IIIA. Each composition, unless specified otherwise, contained 0.75 weight percent EVOH, 0.25 weight percent nylon, 0.50 weight percent PEG, and 0.50 weight percent carbon black concentrate. All weight percents in this paragraph and in Table IIIA are based on total composition weight.

The results of tests on each composition in Table IIIA are given in Table IIIB, below.

TABLE IIIA

| Example | Polyacetal (wt. %) | Acetylated HALS (wt. %) | UV Absorber (wt. %) | Non-Acetylated HALS (wt. %) | Anti-oxidants (wt. %) |
|---|---|---|---|---|---|
| 7 | 96.65 | 0.60 IIA | 0.60 A | — | 0.10 A 0.05 B |
| 8 | 96.80 | 0.60 IIA | 0.60 A | — | — |
| 9 | 96.80 | 0.45 IIA | 0.60 A | 0.15 B | — |
| 10* | 97.60 | 0.15 IIA | 0.30 A | — | 0.10 A 0.05 B |
| 11* | 97.00 | 0.60 IIA | 0.60A | — | — |

*Contained 0.40 weight percent EVOH, 0.15 weight percent nylon, and 0.25 weight percent of a crosslinked non-meltable acrylamide polymer stabilizer prepared as described in U.S. Pat. 5,011,890 (instead of 0.75 weight percent EVOH and 0.25 weight percent nylon).

TABLE IIIB

| | UV Exposure Level | | | |
|---|---|---|---|---|
| | 900 kJ/m$^2$ | | 2000 kJ/m$^2$ | |
| Example | % WL | DE | % WL | DE |
| 7 | 0.04 | 5.34 | 0.28 | 11.0 |
| 8 | 0.07 | 4.29 | 0.31 | 9.27 |
| 9 | 0.03 | 2.21 | 0.26 | 7.51 |
| 10* | 0.00 | 5.00 | 0.14 | 12.8 |
| 11* | 0.03 | 2.73 | 0.26 | 8.19 |

*same as for TABLE IIIA

I claim:

1. A composition consisting essentially of
   (a) 95.00 to 99.95 weight percent of a polyacetal and
   (b) 0.05 to 5.00 weight percent of an acetylated hindered amine light stabilizer having the following Structure (II):

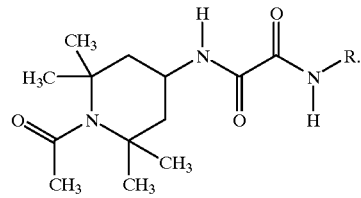

2. The composition of claim 1 further consisting essentially of at least one UV absorber selected from the group consisting of 2-hydroxybenzophenones, 2-(2'-hydroxyphenyl)benzotriazoles, benzoates, substituted oxanilides, and cyano acrylates.

3. The composition of claim 1 further consisting essentially of at least one hindered amine light stabilizer wherein any hindered nitrogen is not acetylated.

* * * * *